May 10, 1927.  
L. H. MORSE  
1,627,662  
ADDRESSING MACHINE  
Filed Oct. 30. 1925  
6 Sheets-Sheet 1

Inventor  
Lawrence H. Morse,  
By Baker, Macklin, Solney & Kean  
Attorneys.

May 0, 1927.

L. H. MORSE 1,627,662

ADDRESSING MACHINE

Filed Oct. 30, 1925    6 Sheets-Sheet 5

Inventor
Lawrence H. Morse

By
Baker, Macklin, Golrick & Fears, Attorneys

May 10, 1927.

L. H. MORSE 1,627,662

ADDRESSING MACHINE

Filed Oct. 30, 1925   6 Sheets-Sheet 6

Inventor
Lawrence H. Morse,
By Bakes, Macklin, Golrick & Pearn
Attorneys

Patented May 10, 1927.

1,627,662

UNITED STATES PATENT OFFICE.

LAWRENCE H. MORSE, OF CLEVELAND, OHIO, ASSIGNOR TO THE AMERICAN MULTIGRAPH COMPANY, OF CLEVELAND, OHIO, A CORPORATION OF OHIO.

ADDRESSING MACHINE.

Application filed October 30, 1925. Serial No. 65,725.

This invention relates to an addressing machine of the type wherein address plates are fed one after another from a stack thereof into position beneath an inking ribbon, and a suitable platen coacts with such positioned plate to print on an interposed sheet of paper or envelope.

The general object of the invention is to provide such a machine in a simple and inexpensive form adapted for convenient and comparatively rapid operation. A feature of the invention is the provision of a segmental platen normally distant from the plate but arranged to have rolling contact therewith, thus allowing ample space and time for the placing of the article to be printed and affecting the printing, a line at a time, whereby a more satisfactory impression is made there by a direct platen stroke. The invention is hereinafter more fully explained in connection with a preferred embodiment thereof illustrated in the accompanying drawings.

Figure 1:
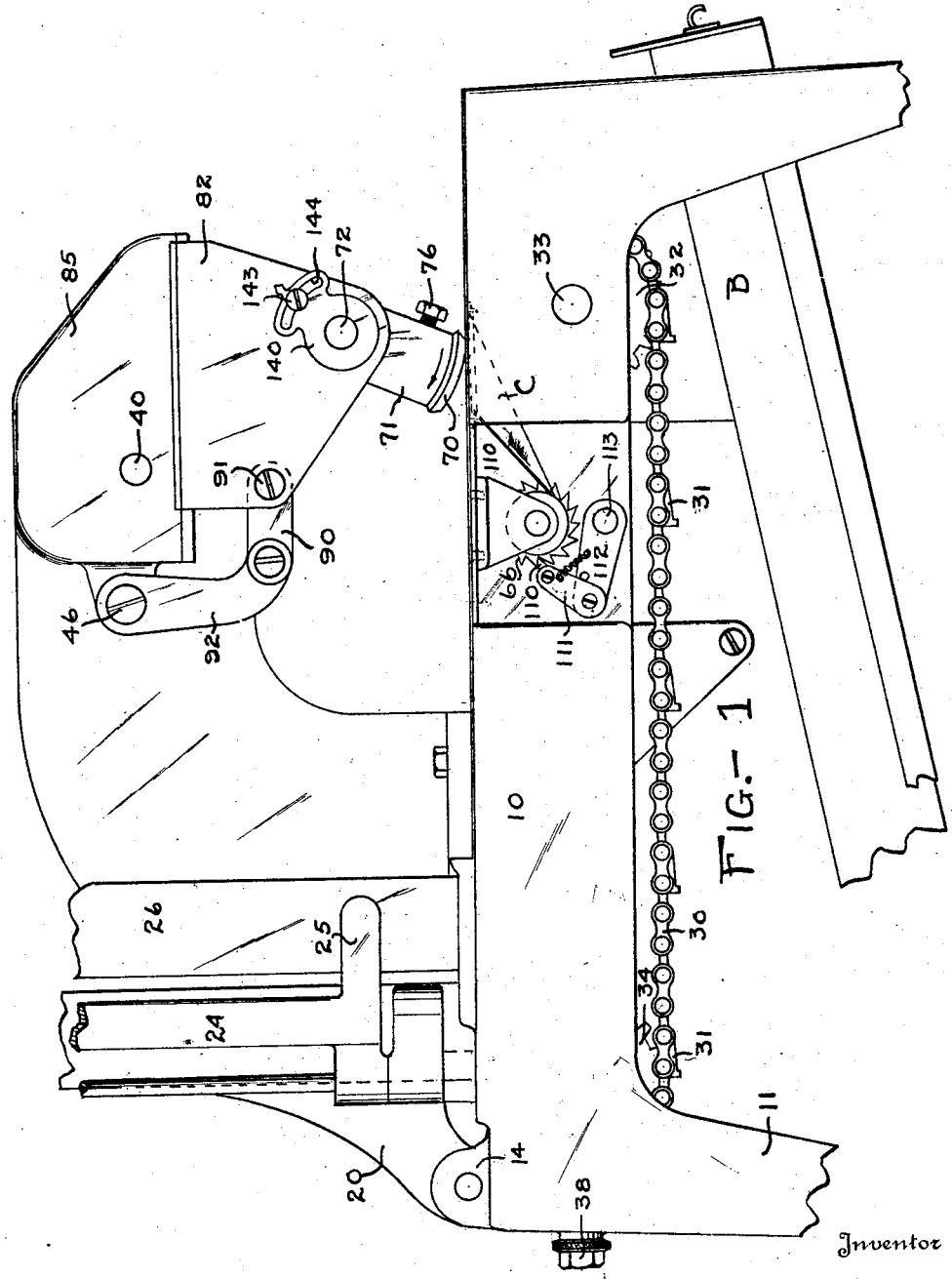
Figure 2:
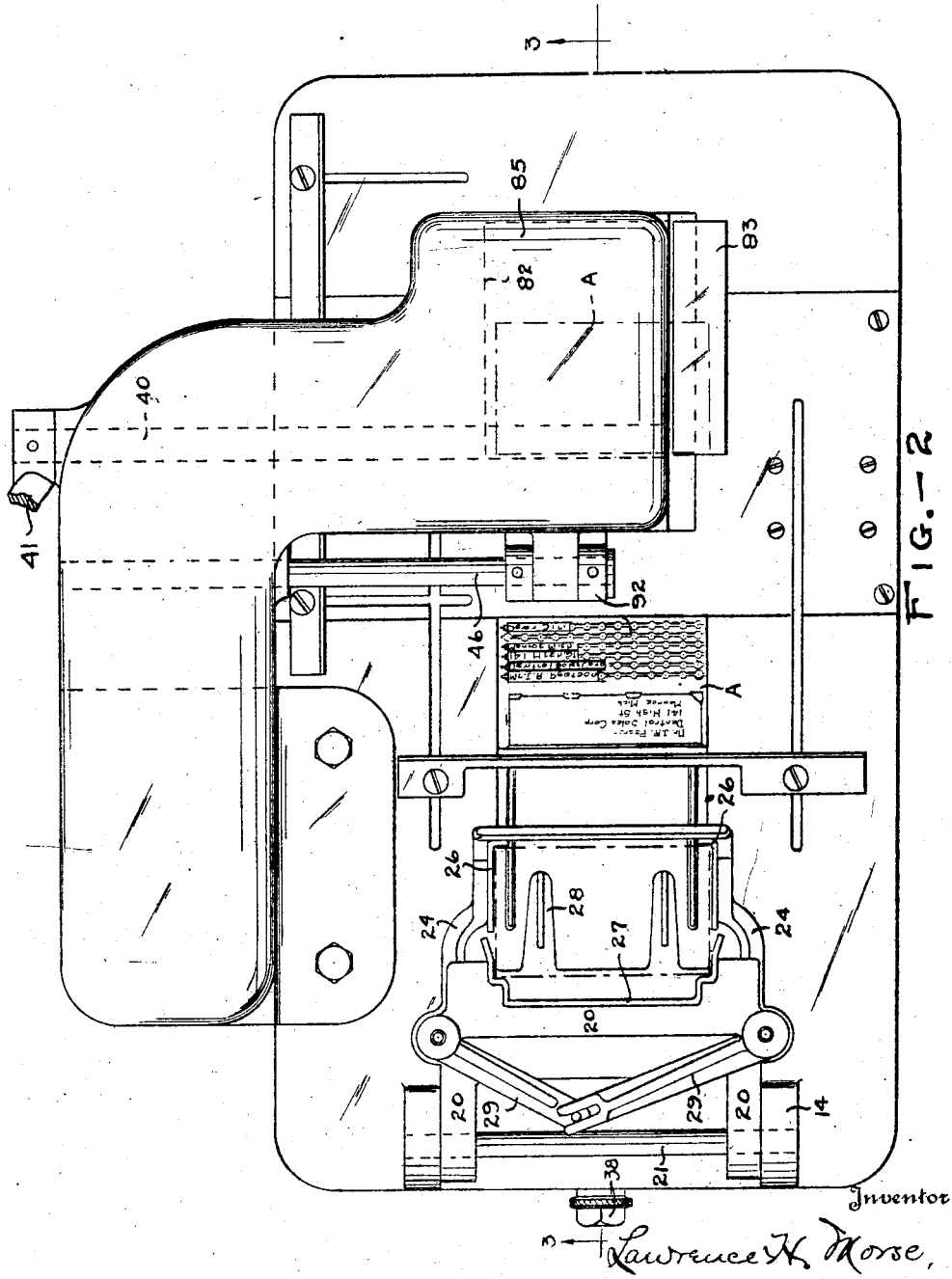
Figure 3:
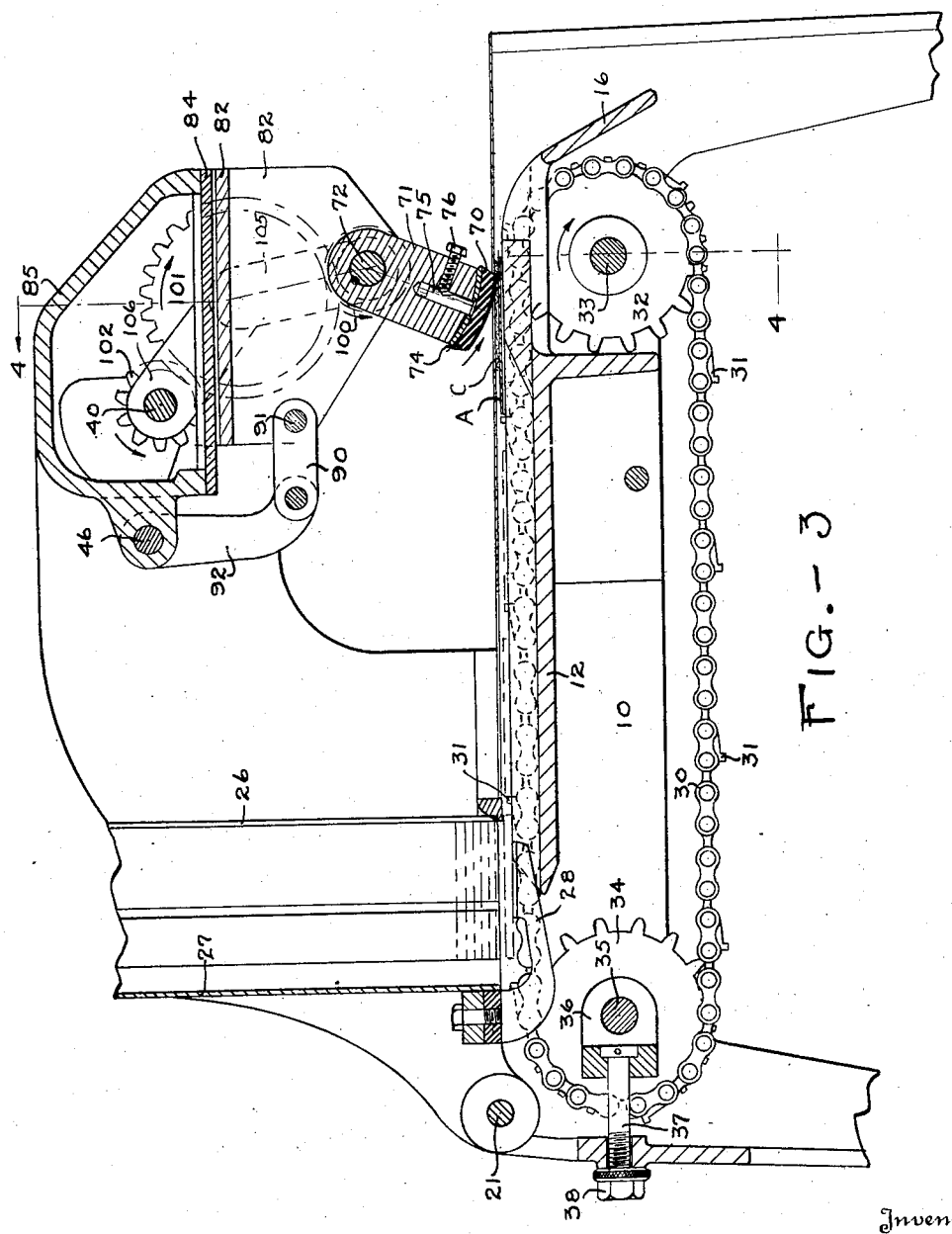
Figure 4:
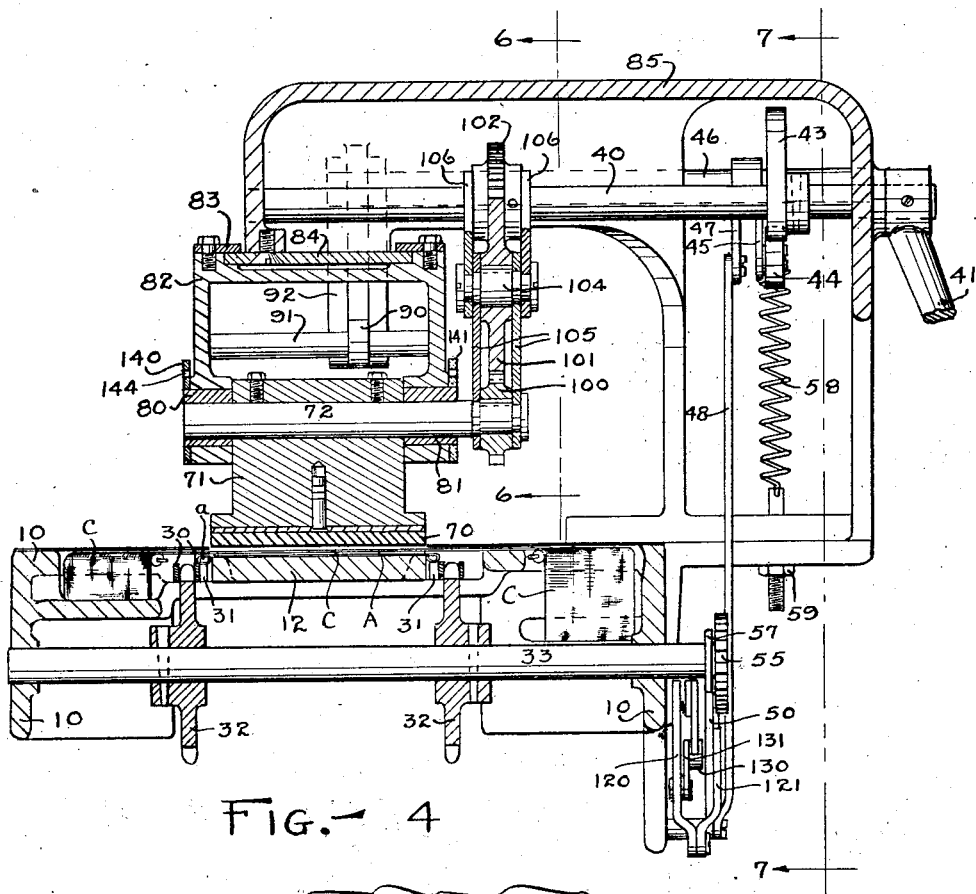
Figure 5:
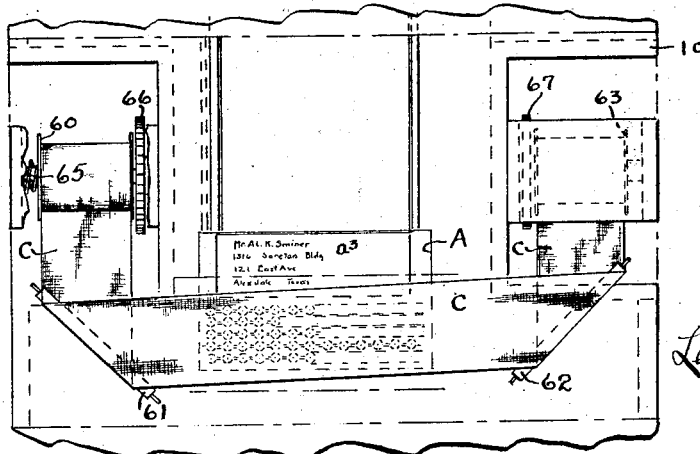
Figure 6:
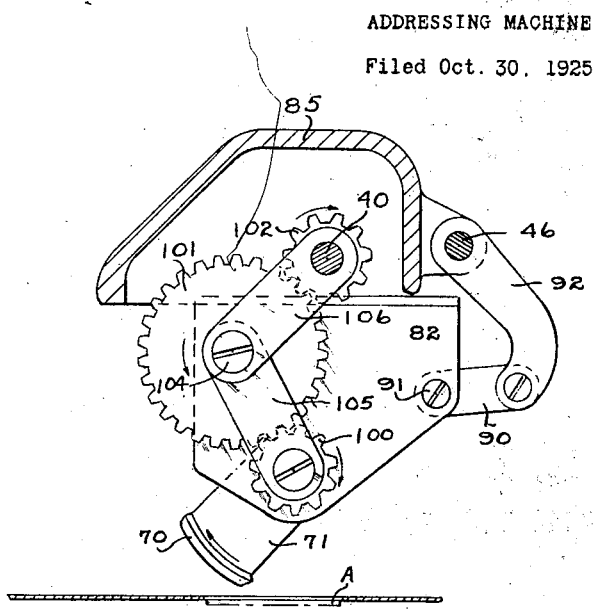
Figure 7:
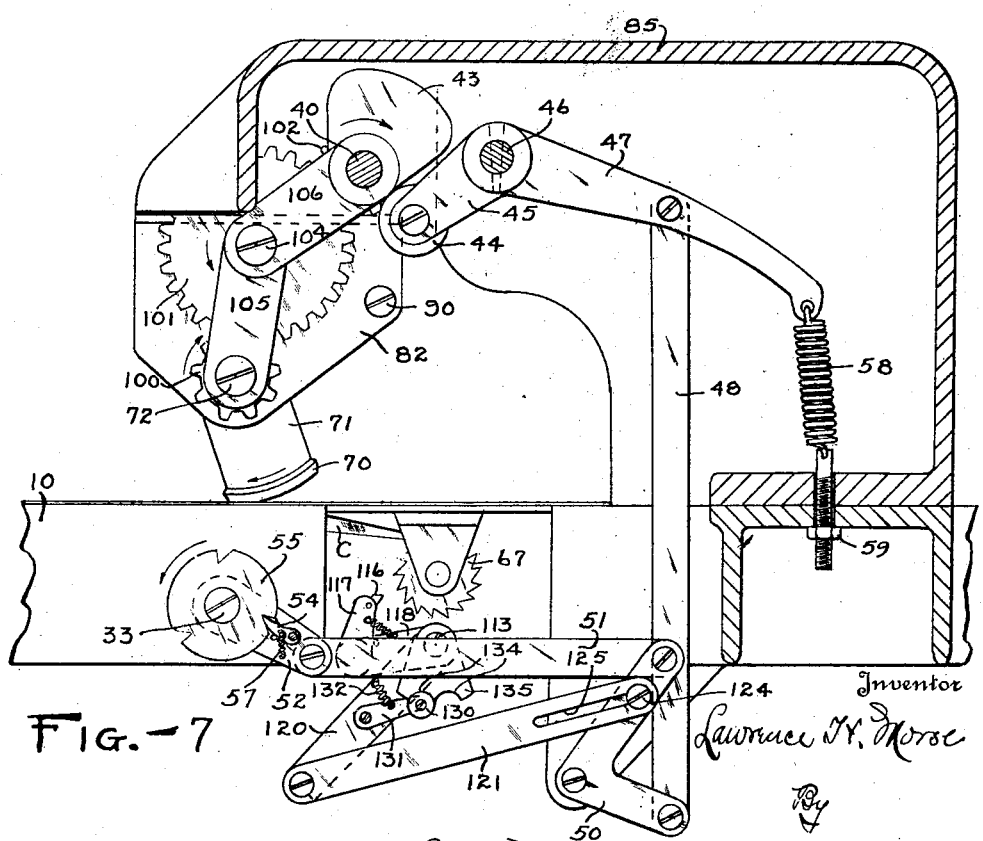
Figure 8:
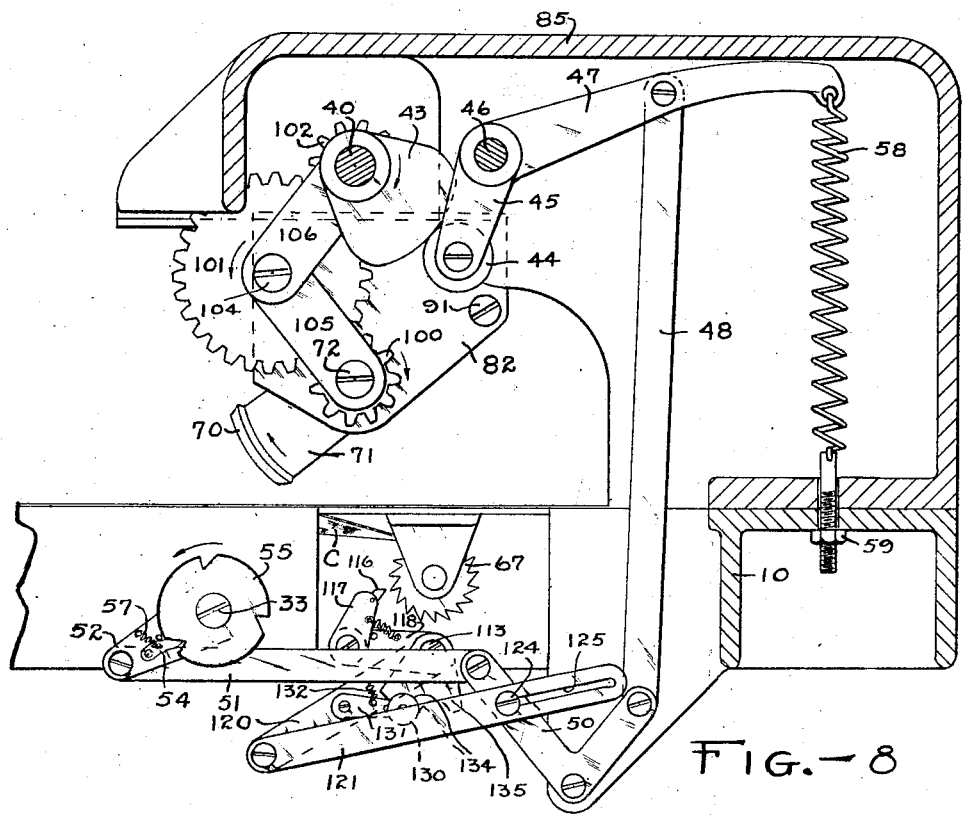
Figure 9:
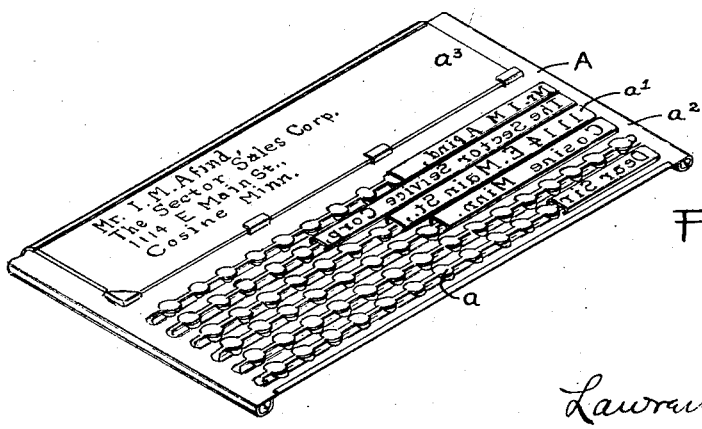

Fig. 1 is a side elevation of the machine partly broken away; Fig. 2 is a plan view; Fig. 3 is a vertical longitudinal section, as indicated by the line 3—3 on Fig. 2; Fig. 4 is a vertical cross-section on the off-set plane indicated by the line 4—4 on Fig. 3; Fig. 5 is a fragmentary plan illustrating the course of the inking ribbon; Fig. 6 is a vertical section along the lines 6—6 in Fig. 4, illustrating the platen driving gearing; Fig. 7 is a vertical section parallel with Fig. 6 and in the plane indicated by the line 7—7 on Fig. 4, and illustrating the plate propelling mechanism, and the ribbon feed; Fig. 8 is a section similar to Fig. 7 with the parts in different position; Fig. 9 is a perspective of an address plate which may be employed with this addressing machine.

As shown, the frame of the machine consists of a horizontally extending border or wall portion 10, supporting legs 11, a horizontal intermediate bed 12, and suitable cross webs.

The magazine for the stack of plates comprising an upright structure at the rear of the machine. As shown, this consists principally of a vertical bracket 20, hinged on a shaft 21 to ears 14, extending upwardly from the bed, and a pair of yokes 24, hinged to opposite edges of the bracket 20, and having arms 25 extending forwardly from the yokes and each carrying an L-shaped shield plate 26 forming sides and a sufficient front for the magazine. The rear of the magazine consists of a vertical plate 27 carried by the bracket 20. The address plates rest on arms 28 beneath the bottom plate. The yokes 24 may be connected by interengaging rock arms 29 whereby they may be swung as a unit to free the stack of plates, by means of a suitable handle (not shown) which may project from one of the arms. For claims on such a magazine, reference is made to application of Clifton Chisholm No. 745,902.

The plates are fed forward one after the other to printing position, and, after printing, discharged by means of a pair of sprocket chains 30 provided with plate-feeding lugs 31. These chains pass around forward sprocket wheels 32 on a sprocket driving shaft 33, and rear sprocket wheels 34 carried by the shaft 35 which is mounted in a transverse yoke 36 adjustable rearwardly by the bolt 37 and nut 38 to keep a proper tension on the chains. The chains lie on opposite sides of the intermediate horizontal bed 12 and the lugs 31 which are on the proximate sides of the two chains, are adapted to engage the end portions of the plate to feed it as the chains are intermittently progressed.

Any suitable form of an address plate may be employed. I have illustrated in the drawings a plate designated A which has on it rows of upstanding overhanging buttons $a$ on which are mounted flanged embossed strips $a^1$ after the manner of Patents Nos. 1438580, 1438582 and 1438584, issued to my assignee The American Multigraph Company Dec. 12, 1922, as shown particularly in Figs. 9 and 4, the plate A has its extreme ends formed into hollow tubular portions $a^2$ which stiffen the plate. The lugs 31 of the chains engage the rear ends of these tubular portions to propel the plate. If desired, the plate may have an index card $a^3$ as illustrated.

My machine may be driven by hand or power by a continuously rotated shaft 40, shown as provided with a crank 41. This shaft, among other operations, causes intermittent progression at the chains by giving partial rotations to the shaft 33, by the following mechanism. On the shaft 40 is a cam 43 coacting with a roller 44 on a rock arm 45 secured to a rock shaft 46. On this rock shaft is another rock arm 47 which is connected by a link 48 to the bell crank 50, Figs. 7 and 8. A link 51 connects the other arm of this bell crank with a rock arm 52 loose on the shaft 33. This rock arm carries a pawl 54 co-active with a ratchet wheel 55 rigid on the shaft 33. A spring 57 maintains the pawl in engagement.

As the shaft 40 is being rotated in the direction of the arrow in Fig. 7, the cam 43 engages the roller 44 rocking the shaft 46, drawing up on the link 48, and thus moves the bell crank and linkage shown, carrying the pawl 54 idly to its other extreme position as shown in Fig. 8; then as the cam clears the roller, a suitable spring (shown as a tension spring 58 anchored to an extension of the arm 47 and adjusted by a nut 59) restores the parts and in this movement the pawl 54 turns the ratchet wheel 55 and thus gives a partial rotation to the shaft 33 sufficient to feed the chains a distance corresponding to the width of one plate.

It will be seen, from the description given that each rotation of the main shaft 40 is accompanied by a forward movement of the chains the distance of one plate. After a few idle rotations, the first plate arrives at the printing position; then it is printed from by mechanism about to be described; after which, on the next rotation, it is discharged and another plate arrives at the printing position. In the discharge, the plate travels downwardly over the inclined cross frame member 16 and drops into a suitable drawer B which may be supported beneath the bed of the machine.

The plate A at the printing position, lies beneath an inking ribbon C, which, as shown in Fig. 5, extends from one spool 60 across a pair of approximately 45° turning bars 61 and 62 to another spool 63. Each of these spools is removably engaged (as by a spring 65) with a suitable ratchet 66 or 67. Mechanism coupled with the plate feed operates to rotate one ratchet or the other periodically, as hereinafter explained, to feed the ribbon slightly during a nonprinting portion of the cycle. As shown in Fig. 5, the ribbon passes slightly diagonally across the plate A, so that practically the whole width of the ribbon is employed in inking, instead of using only separated parallel zones of the ribbon corresponding to the zones of type. This gives more regular inking and a greater effective life of the ribbon.

The impression platen comprises an elastic arcuate pad 70 mounted on a block 71 which is rigidly secured on a shaft 72. As indicated in Figs. 3 and 4, the pad 70 may be rubber on a suitable metal base plate 74 held on the block 70 by means of the stud 75 clamped by a set screw 76.

The shaft 72 is rotatable in bearings 80 and 81 mounted in a carriage 82 which is slidably mounted (by means of overhanging gibs 83) on a stationary plate 84 carried by the overhanging frame arm 85 in which the shafts 40 and 46 are journalled. The carriage 82 is connected by a link 90 (on a shaft 91 mounted on the carriage) with rock arms 92 on the shaft 46. This holds the carriage stationary except when the cam 43 is rocking the shaft 46. The effect of the latter will shortly be explained.

On the shaft 72 carrying the platen is a pinion 100, which meshes with an idler gear 101, which meshes with a pinion 102 pinned to the shaft 40. The idler 101 is mounted on a floating shaft 104 which forms the mutual pivot of a pair of links 105 journalled at their distant ends on the shaft 72 and a pair of links 106 journalled at their distant ends on the shaft 40. The links 105 and 106 may have the position illustrated in Fig. 7 or that illustrated in Fig. 8 or any intermediate position, but they always serve to maintain the idler 101 in mesh with the pinions 100 and 102, irrespective of the position of the carriage 82.

The gearing described causes the platen to revolve continuously as the crank is continuously rotated, the direction of travel of the arcuate platen pad when in the lower portion of its path being from the rear toward the front of the machine, as illustrated by arrows in several figures. The effect of the cam and linkage connection to the carriage is to cause this carriage to move rearwardly during the time the arcuate platen would be passing the plate. This rearward movement of the carriage gives the platen pinion 100 an epicyclic movement on the idler 101 and the idler 101 an epicyclic movement on the drive pinion 102, and these epicyclic movements are of such amount as to exactly counter-balance the rotative driving action of the platen at this time; that is to say, that portion of the cam which is causing the rearward movement of the carriage is so selected that the carriage not only moves a distance as great a width of a printing portion of a plate, but does it at such speed with relation to the driving speed that the platen during such travel has no rotative driving. The result of this is that, instead of traveling relative to the plate, the platen rolls or rocks over the plate, which at that time is stationary.

It will be seen that a sheet of paper or envelope may be readily laid on the ribbon while the platen is in elevated position, and thereafter the revolution of the platen will bring the forward edge thereof into engagement with the paper substantially at the forward edge of the printing portion of the plate as illustrated in Fig. 7, and then the rearward movement of the carriage will carry back the axis of rotation of the platen without otherwise rotating the platen so that the platen will rock across the plate from front to rear, causing a rolling contact impression from the plate. After the rear edge of the platen clears the rear edge of the plate, as illustrated in Fig. 8, the carriage remains in its rear position for a portion of the revolution, and then returns to its forward position. During this non-printing portion of the revolution the plate which was printed from is discharged and a fresh plate is brought into printing position.

The depth of printing impression may be regulated by adjusting the shaft 72 up or down. To effect this, I mount this shaft eccentrically in its bearings 80 and 81, and I provide each bearing with a rock arm 140 and 141 Figs. 1 and 4 whereby corresponding bearings may be adjusted and locked in position, as by a screw 143 passing through a slot 144 in the arm.

The cam mechanism causes the carriage to move back and forth, with a dwell at each end of a stroke, but the only effective part of such movement is that which occurs when the forward edge of the platen comes into co-action with the forward edge of the printing plate and the carriage movement causes the rocking which effects the impression.

The cam is positioned on the shaft to cause the rearward carriage movement at this time, and, as already stated, at such relative speed that the platen does not move past the plate but rocks thereon.

To give the ribbon a periodic feed, and also to reverse the direction of feed automatically when either spool becomes empty, I provide the following mechanism. The ratchets 66 and 67 connected with the respective spools face in opposite directions. Co-acting with the rear edge of the ratchet 66 is a pawl 110 Fig. 1, on an arm 111 mounted on a rock arm 112 extending rearwardly from a rock shaft 113, mounted in the bed. The teeth of the ratchet 67 face in the opposite direction to the ratchet 66 and are engaged by a pawl 116 Fig. 7, on an arm 117 mounted on a rock arm 118 which extends forwardly from the shaft 113. Thus the rocking of the shaft 113 operates one ratchet or the other.

On the ribbon-feeding shaft 113 is a rock arm 120 connected by a link 121 with the upper arm of the bell crank 50, by means of a pin 124 carried by the arm and a slot 125 in the link. The rock arm 120 is loose on the shaft 113, but is locked thereto in either of two positions by means of the roller 130, Fig. 7, pivotally mounted on an arm 131 and drawn by a spring 132 into engagement with one or the other of two notches 134 in a plate-like arm 135, rigid on the shaft 113.

If the roller 130 is in the notch 134 as illustrated in Fig. 7, the rock shaft 113 has such position relative to the arm 120 that when that arm operates, the pawl 110 will act on the ratchet wheel 66 and wind the ribbon on to that spool, the parts having the condition shown in Fig. 1 and 7. The operation takes place on the return stroke of the cam-operated linkage, which causes the pin 124 to engage the distant end of the slot 125 and thus pull on the arm 120, thus shoving upwardly on the pawl 110 to rotate the ratchet 66 to turn the spool 60 and wind the ribbon onto the under portion.

The feeding of the spool 60 just described continues upon each rotation of the main shaft until the spool 63 becomes empty. That condition prevents free rotation of the ratchet 66, and, accordingly, as the mechanism tends to rotate that ratchet, it is retarded at the pawl, which causes the roller 130 to ride over into the rear notch 134. Then, on the next stroke, as the pin 124 reaches the inner end of the slot 125 it will shove the link 121 forwardly, thus shoving upwardly the pawl 116, which will now engage the forward edge of the ratchet 67 and turn the spool 63 to draw the ribbon onto its upper portion. The feeding of the ribbon in either direction is effected either slightly before or slightly after the impression takes place and thus does not interfere with the impressing operation.

It will be understood from the drawings and the above description that my structure allows ample space and the operation ample time for placing a sheet of paper or envelope manually beneath the elevated platen and over the ribbon covering the plate to be printed. Thereafter, the continued rotation brings the platen into coaction with the paper, ribbon and plate and rocks the platen across such members to effect the printing by rolling contact and then continues its movement into its upper or idle region. During this portion of its travel, the printed sheet is manually removed while the plate is automatically discharged to its receiving drawer, and a fresh plate brought into position.

It will be noticed from inspection of Figs. 4 and 5, that the index card $a^3$ on the address plate is in position behind the ribbon where it may be read by the operator before the impression takes place. If for any reason the operator wishes to omit any particular address plate or plates from the printing operation he simply oscillates the crank through a portion of the upper part of its stroke, which thus feeds a plate but by reason of the platen being elevated has no impressing action. The operator can accordingly read the addresses on the plates, and by oscillating the crank, discharge idly into the receiving drawer as many plates as he wishes to omit, while by making complete rotations he may print from whatever plates he desires.

Having thus described my invention, I claim:—

1. The combination of a printing member, a platen, means for revolving the platen continuously, and means for moving the axis of revolution in a single plane to cause the platen to roll across the printing member.

2. The combination, with a flat form, of a platen mounted to turn on an axis, means for moving said axis to cause the platen to roll over the form, and means for holding the axis stationary and revolving the platen on said axis while out of contact with the form.

3. The combination of a flat printing member, a segmental platen, means for revolving the platen continuously, and means for moving the axis of revolution in a plane parallel with the printing member and at a speed to counteract the driving effect at the platen surface to cause the platen to roll across the printing member.

4. The combination with a flat form, of a platen mounted to turn on an axis, means for moving said axis to cause the platen to roll over the form when stationary, and means for feeding the form into and out of printing position during such revolving period.

5. The combination with a type form, of a segmental platen mechanism for rolling the same in coaction with the type form while stationary, and for thereafter revolving the platen relative to the type form, and means for feeding the type form during the period while the platen is revolving out of coaction therewith.

6. The combination with a magazine for address plates, means for feeding the same one by one to a printing position, a segmental platen, means for continuously revolving it, means for causing its axis of revolution to travel, whereby the effect of the revolution is that the platen rolls on the address plate.

7. The combination of a printing member, mechanism for intermittently progressing it, a platen adapted to coact therewith, a rotary shaft on which the platen is mounted, and mechanism for causing said shaft to travel parallel with the printing member when the platen is in coaction with the printing member and the printing member is stationary, and for revolving the shaft and platen when out of such coaction.

8. In an addressing machine, the combination with a set of flat address plates, of means for intermittently feeding them, a platen adapted to coact with such address plates, means for rolling the platen while in coaction with a stationary plate, and for revolving it while out of such coaction.

9. The combination with a set of address plates, means for feeding the same intermittently to and from printing position, a segmental platen, means for continuously revolving it, means for causing its axis of revolution to travel in a plane parallel with the plate which is in printing position between the feeding movements of such plate, whereby the effect of the revolution is that the platen rolls on the address plate.

10. The combination with a type form, of a carriage movable in a plane parallel therewith, of a segmental platen mounted on the carriage to revolve about an axis distant from the segmental surface and means for moving the carriage to roll the platen in coaction with the type form while stationary, and for thereafter revolving the platen relative to the type form.

11. In an addressing machine, the combination with means for intermittently moving address plates one after the other to printing position, a segmental platen, a sliding carriage in which the same is revolubly mounted, means for continuously revolving the platen, means for moving the carriage in such timed relation to the position of the platen that it rolls in coaction with the plate positioned for printing.

12. In an addressing machine, the combination with a magazine for address plates, a pair of chains, means for intermittently moving them to feed the address plates one after the other from the magazine to printing position, a segmental platen, a sliding carriage in which the same is revolubly mounted, means for continuously revolving the platen, means for moving the carriage in such timed relation to the position of the platen that it rolls in coaction with the plate while it is stationary.

13. The combination with means for supporting a printing form, a coacting segmental platen, a shaft on which the same is mounted, a carriage in which the shaft is journalled, a drive shaft mounted independently of the carriage, gearing connecting the drive shaft with the platen shaft, and mechanism for shifting the carriage.

14. The combination with a magazine for address plates, means for intermittently feeding the same, a segmental platen, a shaft on which the same is mounted, a carriage in which the shaft is journalled, a drive shaft mounted independently of the carriage, gearing connecting the drive shaft with the platen shaft, and mechanism for shifting the carriage at such time that the platen rolls on a stationary address plate.

15. The combination with means for supporting a printing form, a segmental platen adapted to coact therewith, a shiftable carriage, a shaft journalled in the carriage and carrying the platen, a drive shaft independent of the carriage, a train of gears connecting the drive shaft with the platen shaft, including a floating idler whereby the gearing is maintained irrespective of the position of the carriage, and mechanism for automatically moving the carriage.

16. The combination with means for supporting a printing form, a segmental platen adapted to coact therewith, a shiftable shaft carrying the platen, a drive shaft, a train of gears connecting the drive shaft with the platen shaft including a floating idler, and links connecting the axis of the idler with the drive shaft and platen shaft respectively.

17. The combination of means for supporting a printing form, a platen adapted to coact therewith, a shaft on which the platen is mounted, a carriage in which the shaft is journalled, a drive shaft mounted independently of the carriage, gearing connecting the drive shaft to the platen shaft, a cam operated by the drive shaft, and mechanism operated by the cam for moving the carriage.

18. The combination of means for supporting a printing form, a platen adapted to coact therewith, a shiftable shaft on which the platen is mounted, a drive shaft, gearing connecting the drive shaft to the platen shaft, a cam on the drive shaft, and a rock shaft turned by the cam, and connecting mechanism between the rock shaft and platen shaft.

19. In an addressing machine, the combination with a magazine for address plates, a pair of endless chains adapted to feed address plates from the bottom of the magazine forwardly, means carrying the chains including two sprockets mounted on a shaft, the rotation of which feeds the chains, a platen to coact with an address plate, said platen being mounted on a shiftable axis, a driving member, and connections therefrom for shifting said axis and for giving partial rotations to said sprocket shaft.

20. In an addressing machine, the combination with a bed, of a magazine for address plates carried thereby, a pair of endless chains adapted to feed address plates from the bottom of the magazine forwardly, sprockets carrying the chains including two sprockets mounted on a shaft, the rotation of which feeds the chains, a platen to coact with an address plate, said platen being mounted in a shiftable carriage, a driving member and connections therefrom for continuously rotating the platen, for reciprocating the carriage and for partially rotating the sprocket shaft.

21. In an addressing machine, the combination with a bed, of a magazine for address plates carried thereby, a pair of endless chains adapted to feed address plates from the bottom of the magazine forwardly, a platen to coact with an address plate, said platen being mounted in a shiftable carriage, a drive shaft, a cam on the drive shaft, a rock arm operated by the cam, a ratchet connection between the rock arm and the sprocket chains, to periodically feed the sprocket chains, and a connection between the rock shaft and carriage to reciprocate the carriage.

22. In an addressing machine, the combination with the frame of a magazine for address plates carried thereby, a pair of endless chains adapted to feed address plates from the bottom of the magazine forwardly, sprockets carrying the chains including two sprockets mounted on a shaft, the rotation of which feeds the chains, the frame having an overhanging arm, a carriage slidably mounted thereon, a platen to coact with an address plate, said platen being eccentrically mounted in shiftable bearings in the sliding carriage, a driving member and connections therefrom for operating the platen, the carriage and the sprocket shaft.

23. In an addressing machine, the combination of a magazine for address plates, means providing a path along which the same may be fed, means for feeding the plates one after the other along said path, a pair of ribbon spools on opposite sides of said path, a pair of turning bars, a ribbon passing from one spool about a turning bar, and then across said path to the other spool, and means for periodically feeding the plates one after the other beneath the ribbon, a segmental platen mounted on an axis above the ribbon, mechanism for revolving the platen and at the same time moving said axis parallel with the plate which is beneath the ribbon to cause the platen to rock over the ribbon and plate, and means for feeding the ribbon at a time when the platen is out of such rocking coaction.

24. In an addressing machine, the combination of means for feeding address plates one after the other along a pathway, an inking ribbon extending transversely of said pathway and adapted to cover the plate in printing position, a platen adapted to cover the plate in printing position, means for causing the platen to roll over the ribbon and plate to effect the impression and for revolving it about an axis while out of coaction and means for intermittently progressing the plates and intermittently feeding the ribbon during a non-printing portion of the revolution of the platen.

25. In an addressing machine, the combination of means for feeding address plates, means for printing from said plates, a driving device, mechanism whereby complete rotations of the driving device effect both printing and feeding of the plates, while oscillations of the driving device effect the feeding without the printing.

26. In an addressing machine, the combination of address plates, plate feeding mechanism, printing mechanism, a driving crank, and means whereby rotations of the driving crank operate both of said mechanisms while oscillations of the driving crank operate the feeding mechanism without printing.

27. In an addressing machine, the combination of a guide along which address plates may be fed, a pair of ribbon spools respectively on opposite sides of the bed, mechanism for progressing the plates one after the other beneath the intermediate position of the ribbon, means for periodically feeding one of the ribbon spools, and means for automatically changing the feed to the other spool when the first is exhausted.

28. In an addressing machine, the combination with means for feeding address plates one after the other along a path, a pair of ribbon spools on opposite sides of said path with their axes transverse of the path, a pair of turning bars, a ribbon passing from one spool about a turning bar and then across the path to the other spool, means for periodically feeding the ribbon, and means for automatically reversing the direction of feed.

29. In an addressing machine, the combination with means for feeding address plates, of a ribbon adapted to overlie a plate in printing position, a pair of spools carrying the wound up ends of the ribbon, oppositely facing ratchets on the respective spools, a rock shaft, means extending therefrom in one direction and coacting with one ratchet, and means extending therefrom in the opposite direction, and coacting with the other ratchet, an operating member for rocking the rock shaft, and a spring-held connection between the operating member and rock shaft, allowing shifting when either ratchet is retarded, whereby the feed is automatically changed from one spool to the other.

30. In a printing machine, the combination of a flat form, a revoluble platen adapted to coact therewith, means for revolving the platen continuously, and means for reciprocating the axis of the platen without changing the perpendicular distance between it and the form.

31. In a printing machine, the combination of a flat form, a revoluble platen adapted to coact therewith, means for revolving the platen continuously about an axis, and means for reciprocating said axis in a single plane parallel with the form, one stroke of said reciprocation being while the platen is in contact with the form.

32. In a printing machine, the combination of a flat printing form, a platen adapted to roll over the form, a driving shaft on a stationary axis, gearing between the driving shaft and the platen, and mechanism for reciprocating the platen axis during the driving in a plane parallel to the printing form.

33. The combination with the means for holding a printing form, of a platen mounted on a shiftable axis and adapted to coact with the form, means for rotating the platen about said axis while the axis is stationary and the platen is out of contact with the form and for rotating it while the axis is moving and the platen is in contact with the form, means for shifting the platen axis and a single driving device for operating said rotating means and said shifting means.

34. In a printing machine, the combination of means for holding a printing form, a platen having a curved surface adapted to be rolled over the form, means for driving the platen continuously to cause it to revolve about an axis, and means for automatically shifting the axis while the platen is rotating and in contact with the form, said shifting being at such speed as will neutralize the relative effect of the platen surface relative to the frame.

35. In a printing machine, the combination of a printing form, a platen adapted to roll over the form, movable mechanism adapted to drive the platen about an axis, and movable mechanism for reciprocating the platen axis during the driving at a speed which will neutralize the rotative effect of the platen surface relative to the printing form.

36. In a printing machine, the combination of a flat printing form, of means for driving a platen about an axis maintained in a plane at a fixed distance from the form, and means for shifting the axis of the platen within that plane at a speed to counteract the driving effect on the platen surface whereby such surface may roll over the form without its line of contact traveling with reference thereto.

37. In a printing machine, the combination with means for holding a printing form, of a platen having a curved surface adapted to be rolled over the form, movable driving gearing adapted to revolve the platen continuously about an axis, and means for automatically shifting the axis while the platen is rotating.

38. In a printing machine, the combination with a printing form, a revoluble platen mounted on a shaft, a pinion on said shaft, a driving device, movable gearing connecting the driving device to the pinion, and means for shifting the axis of the platen.

39. In a printing machine, the combination of a flat printing form, a platen adapted to roll over the form, a driving shaft on a stationary axis, constantly meshing movable gearing between the driving shaft and the platen, and mechanism for reciprocating the platen axis during the driving, in a plane parallel to the printing form.

40. In a printing machine, the combination with means for holding the form, a platen mounted to revolve about an axis, a driving device, external gearing connecting the driving device with the platen, and means for shifting the axis of the platen while preserving the meshing of said gearing.

41. In a printing machine, the combination with means for holding the form, a platen mounted to revolve about an axis, a driving device, a train of spur gearing connecting the driving device with the platen, and means for shifting the axis of the platen while preserving the meshing of said gearing.

42. In a printing machine, in combination with means for holding the form, of a revoluble platen shiftably mounted, a driving shaft mounted on a fixed axis, and gearing between the driving shaft and the platen including a floating gear maintained in mesh with a gear about the platen axis.

43. In a printing machine, the combination with means for holding the form, a driving gear, a revoluble platen, a gear on the platen, floating gearing connecting said two gears, and mechanism for moving the axis of the platen.

44. In a printing machine, the combination with means for holding the form, a driving shaft on a fixed axis, a revoluble platen, a shaft therefor, a gear on the driving shaft, a gear on the platen shaft, floating gearing connecting said two gears, and mechanism operated by the driving shaft for reciprocating the axis of the platen shaft.

45. In a printing machine, the combination with automatic means for periodically presenting a fresh form in printing position, a revoluble platen adapted to coact therewith, means for revolving the platen continuously, and means for reciprocating the axis of the platen without changing the perpendicular distance between it and the form.

46. In a printing machine, the combination with means for holding a printing form, of a platen adapted to be rolled over the form, and mechanism for rolling the platen without driving the surface with reference to the form, while it is in contact with the form, and for driving it without rolling it at a time when it is out of contact with the form, and automatically acting means for feeding printing forms to the printing position following the action of the platen thereon.

47. In an addressing machine, the combination with a series of address plates, means for periodically feeding them one after another to printing position, a platen having a curved surface adapted to be rolled over the positioned address plate, means for driving the platen continuously to cause it to revolve about an axis, and means for automatically shifting the axis while the platen is rotating and in contact with the address plate, said shifting being at such speed as will neutralize the rotative effect of the platen surface relative to the address plate.

48. In a printing machine, the combination with means for holding an address plate, of a platen having a curved surface adapted to be rolled over such plate, movable driving gearing adapted to revolve the platen continuously about an axis, means for automatically shifting the axis while the platen is rotating, and automatic mechanism for shifting the address plate into printing position and from printing position before and after the action of the platen respectively.

49. In a printing machine the combination of a platen mounted to revolve about an axis, a driving device, external gearing connecting the driving device with the platen, means for shifting the axis of the platen while preserving the meshing of said gearing, mechanism for moving a form into position to receive the platen impression and from such position after the impression, and connection between said mechanism and driving device.

50. The combination with a magazine for address plates, of a conveyor for feeding the plates to printing position, a revoluble segmental platen adapted to coact with the positioned plate, the axis of said platen being shiftable parallel with the path of movement of the plate, a driving shaft, and connecting mechanism between the shaft and the conveyer and between the shaft and the platen including a floating gear maintained in mesh with a gear about the platen axis.

51. In a printing machine, the combination with a printing form and a coacting platen, of mechanism for rolling the platen over the form to effect the impression, and revolving it while out of coaction with the form about an axis which is maintained at a constant distance from the plane of the form and parallel therewith.

52. The combination, with a segmental platen, of mechanism for rolling the same in coaction with a stationary type form, and for thereafter revolving the platen relative to the type form about an axis which is maintained at a constant distance from the plane of the form and parallel therewith.

53. In a printing machine, the combination with a printing form and a coacting segmental platen, mechanism for rolling it in coaction with the form while the form is stationary, and revolving it while out of coaction with the form about an axis which is maintained at a constant distance from the plane of the form and parallel therewith.

54. The combination of a printing member, a platen adapted to coact therewith, a rotary shaft on which the platen is mounted, and mechanism for causing said shaft to revolve the platen while out of coaction with the printing member, for moving said shaft in one direction during the period of no coaction and for moving it in the opposite direction when the platen is in coaction with the printing member, whereby the platen is rolled across the printing member.

55. In an addressing machine, the combination of means for feeding address plates, of a platen adapted to coact with such address plates, means for rolling the platen while in such coaction, and for revolving it about an axle while out of such coaction, and moving such axis during such revolution.

56. In an addressing machine, the combination of plate feeding mechanism, printing mechanism, a common driving means therefor adapted to be operated selectively by a complete rotation and by an oscillation, and means whereby one of such manners of operation will actuate both mechanisms and the other manner of operation will actuate the plate feeding mechanism without printing.

57. In a printing machine, the combination with means for holding a stationary printing form, of a platen adapted to be rolled over such stationary form, mechanism for moving the platen axis without driving the platen surface relative to the form, whereby the platen rolls in coaction with the same, and means for moving the platen axis in the opposite direction at a time when its surface is out of contact with the form.

In testimony whereof, I hereunto affix my signature.

LAWRENCE H. MORSE.